(12) United States Patent
Allen et al.

(10) Patent No.: US 8,937,597 B2
(45) Date of Patent: Jan. 20, 2015

(54) HANDHELD ELECTRONIC DEVICE HAVING A SLIDABLE KEYBOARD

(75) Inventors: Aaron Robert Allen, Pembroke Pines, FL (US); Jason Tyler Griffin, Kitchener (CA); Timothy Herbert Kyowski, Kitchener (CA)

(73) Assignee: BlackBerry Limited, Waterloo, Ontario ( * ) Notice: Subject to any disclaimer, the term of this patent is extended or adjusted under 35 U.S.C. 154(b) by 160 days.

(21) Appl. No.: 13/460,996

(22) Filed: May 1, 2012

(65) Prior Publication Data

US 2013/0293474 A1 Nov. 7, 2013

(51) Int. Cl.
*G06F 3/02* (2006.01)
*G09G 5/00* (2006.01)

(52) U.S. Cl.
USPC .......................................... 345/169; 345/168

(58) Field of Classification Search
USPC .................................. 345/168–172
See application file for complete search history.

(56) References Cited

U.S. PATENT DOCUMENTS

| | | | |
|---|---|---|---|
| 6,331,850 B1 * | 12/2001 | Olodort et al. | 345/168 |
| 6,920,039 B2 | 7/2005 | Mochizuki et al. | |
| 6,950,038 B2 | 9/2005 | Hsu | |
| 7,395,100 B2 | 7/2008 | Cha et al. | |
| 7,567,237 B2 * | 7/2009 | Kemppinen | 345/168 |
| 7,599,721 B2 | 10/2009 | Taki et al. | |
| 8,031,087 B2 | 10/2011 | Olodort et al. | |
| 2005/0213744 A1 | 9/2005 | Valli | |
| 2006/0017700 A1 | 1/2006 | Kemppinen | |
| 2007/0133788 A1 | 6/2007 | Ladouceur | |
| 2013/0033431 A1 * | 2/2013 | Ladouceur et al. | 345/169 |
| 2013/0033432 A1 * | 2/2013 | Ladouceur et al. | 345/169 |

OTHER PUBLICATIONS

Search Report dated Apr. 30, 2014, issued in European Application No. 12176427.8 (6 pages).

* cited by examiner

*Primary Examiner* — Kevin M Nguyen
*Assistant Examiner* — Cory Almeida
(74) *Attorney, Agent, or Firm* — Fish & Richardson P.C.

(57) ABSTRACT

A handheld electronic device may include a housing and a display supported by the housing. The handheld electronic device may further include a slider element slidably mounted to housing. The slider element may be configured to move relative to the housing between a closed position and an open position. A keyboard may be coupled to slider element, and may move between a stowed position behind the display and a fully deployed position.

20 Claims, 7 Drawing Sheets

HANDHELD ELECTRONIC DEVICE HAVING A SLIDABLE KEYBOARD

FIELD

This disclosure relates generally to a handheld electronic device and, more particularly, to a handheld electronic device having a slidable keyboard.

BACKGROUND INFORMATION

Numerous types of handheld electronic devices are known. Examples of such handheld electronic devices include, for instance, personal data assistants (PDAs), handheld computers, two-way pagers, mobile telephones, and the like. Some handheld electronic devices feature wireless communication capabilities. Other handheld electronic devices are stand-alone devices that are functional without communication with other devices.

A typical handheld electronic device has a display supported by a housing. The display is generally a component having fixed physical dimensions. Certain devices also include an input portion in the form of, for example, a keyboard or keypad.

In attempts to provide a more compact and portable design for some handheld electronic devices having a large display, the input portion may be positioned between a battery and the display in the thickness direction of the device. A user may slide, twist, or flip the input portion relative to the display (e.g., flip or slide) for access to the input portion. While these designs may be generally effective for their intended purposes, these designs have increased the overall thickness of the handheld electronic device.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated throughout the drawings. Wherever possible, the same reference numbers are used in the drawings and the description to refer to the same or like parts.

The disclosure generally relates to a handheld electronic device. Examples of handheld electronic devices include mobile wireless communication devices such as pagers, mobile phones, mobile smart-phones, wireless organizers, personal digital assistants, wireless-enabled notebook computers, and any other known communication device.

Figure 1:
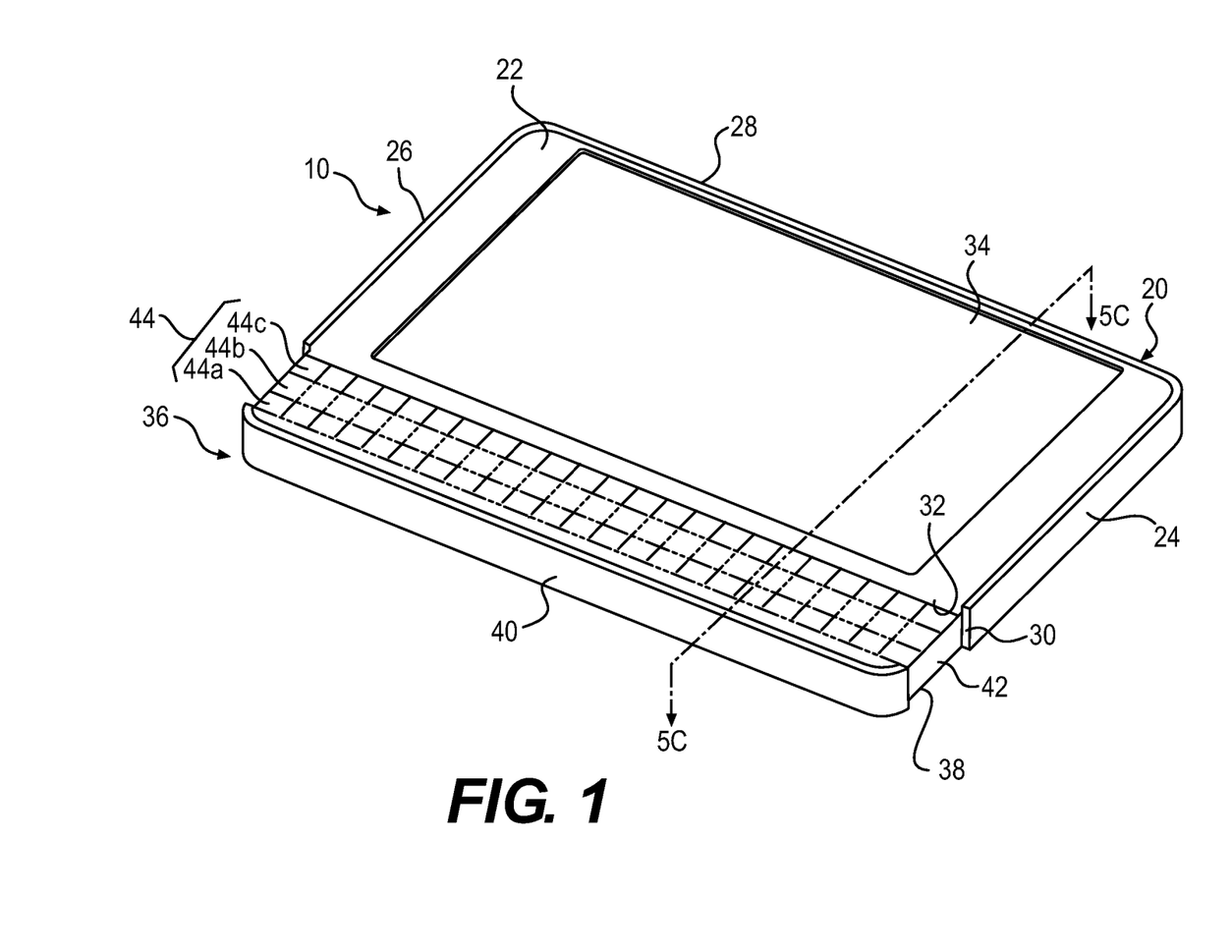
FIG. 1 is a perspective front view of a handheld electronic device having a slider element in an open position and a keyboard coupled to the slider element in a fully deployed position, consistent with disclosed embodiments.
Figure 2:
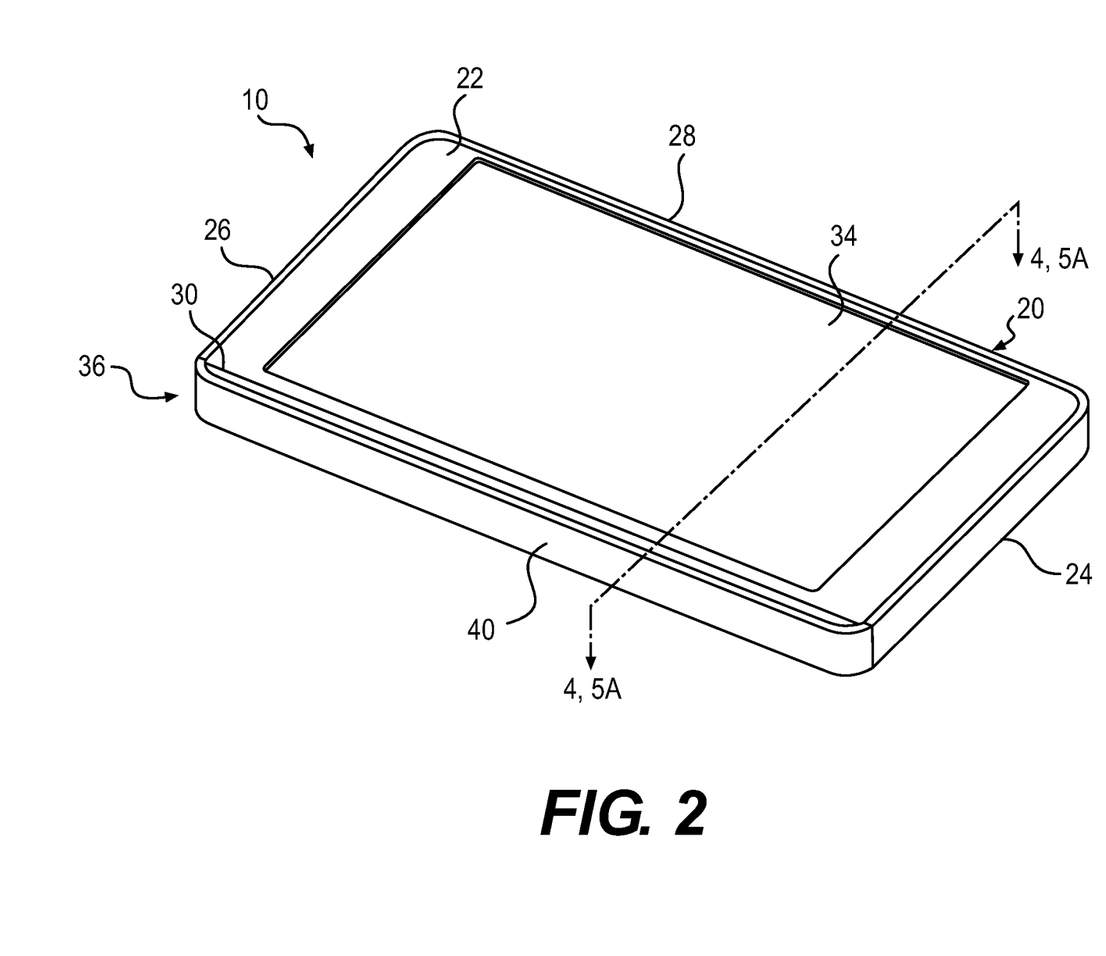
FIG. 2 is a perspective front view of the handheld electronic device having the slider element in a closed position and the keyboard in a stowed position, consistent with disclosed embodiments.

An exemplary handheld electronic device 10 is illustrated in FIGS. 1 and 2. Handheld electronic device 10 includes a housing 20, a display 34, a slider element 36, and a keyboard 44 linked to slider element 36. As shown in these figures, handheld electronic device 10 is of the "slide" or "slider" variety which, as will be described below, refers to the ability of keyboard 44 to move relative to housing 20 to be translated between a fully deployed position (FIG. 1) and a stowed position (FIG. 2).

Housing 20 has a front housing portion 22 and a rear housing portion 24. Front housing portion 22 and rear housing portion 24 may be fabricated from plastic, metal, or the like, and may be directly or indirectly joined to each other in any number of ways, e.g., by using fasteners, adhesives, and/or snap fit portions formed in the housing portions. Display 34 is supported by front housing portion 22. Display 34 includes an organic light-emitting diode (OLED) display, an e-ink display, a liquid crystal display (LCD), or another type of display. In some embodiments, display 34 may be a touch screen display.

A slot 32 is formed in rear housing portion 24 along a side of housing 20 to provide access to an interior of housing 20 behind display 34. In the exemplary embodiment shown in FIG. 1, slot 32 is formed along a bottom 30 of housing 20. Slot 32, however, may alternatively be formed along a top 28 or either side 26 of housing 20. Slider element 36 is positioned in slot 32 and slidably mounted to rear housing portion 24. As shown in FIGS. 1 and 2, slider element 36 is arranged to slide into and out of slot 32 relative to housing 20 between a closed position (FIG. 2) and an open position (FIG. 1).

Figure 5A:
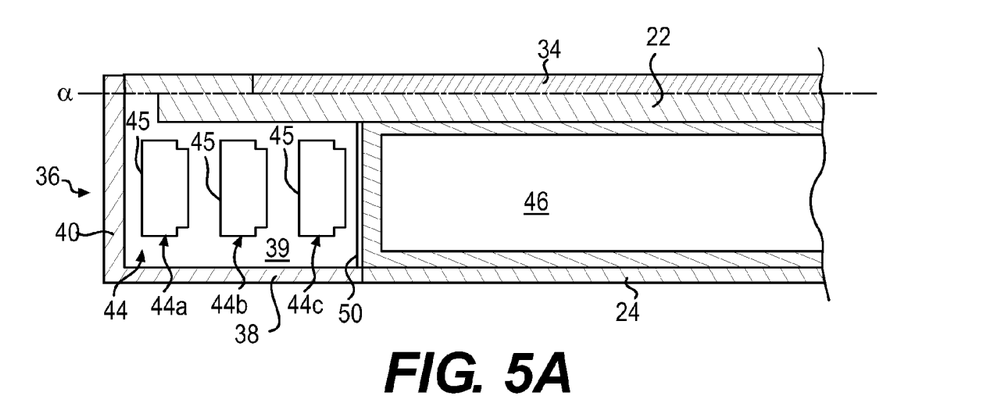
FIG. 5A is a partial cross-section view of the handheld electronic device, taken along the plane 5A-5A shown in FIG. 2, with the keyboard in the stowed position and a plurality of rows of the keyboard configured in a compact arrangement, consistent with disclosed embodiments.
Figure 5B:
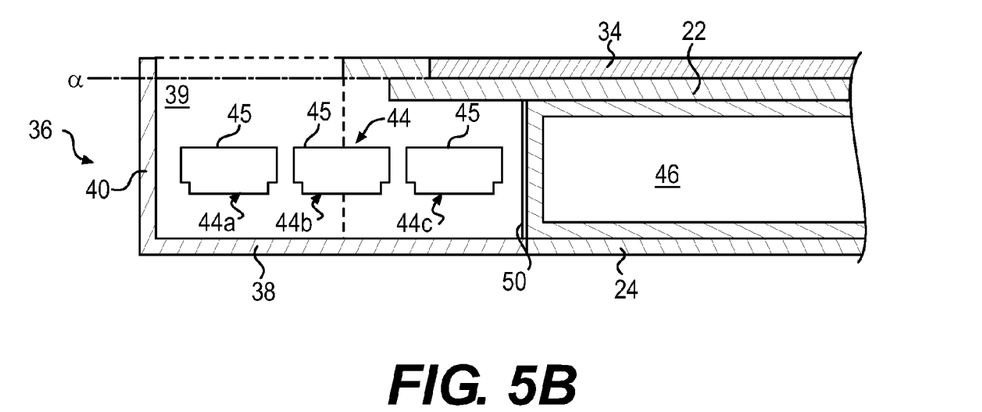
FIG. 5B is a partial cross-section view of the handheld electronic device with the keyboard in a partially deployed position and with the plurality of rows of the keyboard configured in an expanded arrangement, consistent with disclosed embodiments.
Figure 5C:
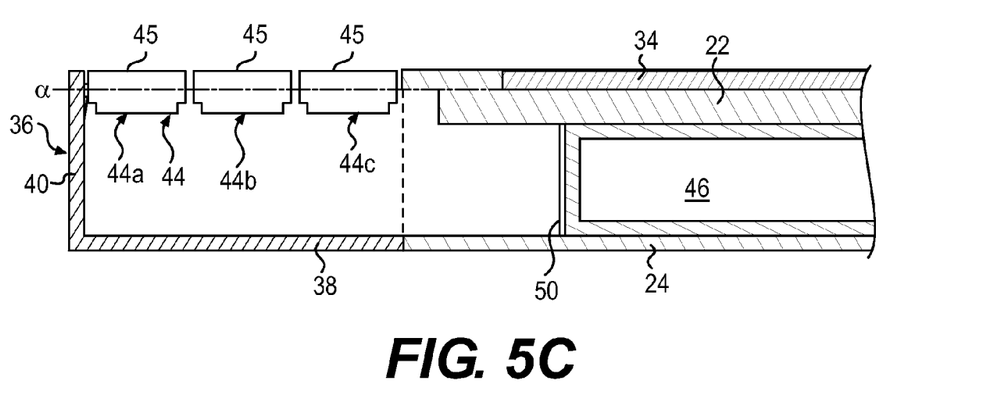
FIG. 5C is a partial cross-section view of the handheld electronic device, taken along the plane 5C-5C shown in FIG. 1, with the keyboard in the fully deployed position with the plurality of rows of the keyboard configured in the expanded arrangement, consistent with disclosed embodiments.

As shown in FIGS. 5A-5C, slider element 36 includes a base wall 38, a front wall 40, and a pair of side walls including side wall 42 (see FIG. 1) that, together, define a cavity 39 therein. Keyboard 44 is coupled to front wall 40 of slider element 36 and is arranged to move in and out of cavity 39 between a stowed position (FIG. 2) and a fully deployed position (FIG. 1) as slider element 36 moves between the closed position (FIG. 2) and the open position (FIG. 1) and vice versa. Keyboard 44 can be a numeric keyboard, an alphabetic keyboard, an alphanumeric keyboard, a QWERTY keyboard, or any other keyboard configuration incorporating one of these layouts or portions thereof. Keyboard 44 includes a plurality of keys arranged in rows that extend substantially parallel to top 28 and bottom 30 of housing 20. In the exemplary embodiment, keyboard 44 includes keys arranged in a first row 44a, a second row 44b, and a third row 44c. It is contemplated that keyboard 44 may include a greater or less number of rows.

As shown in FIG. 1, when slider element 36 is in the open position, front wall 40 of slider element 36 is spaced from bottom 30 of housing 20 and keyboard 44 is fully deployed for access by a user of the handheld electronic device 10. As shown in FIG. 2, when slider element 36 is in the closed position (FIG. 2), base wall 38 and side walls (including side wall 42) of slider element 36 are received in slot 32, and front wall 40 of slider element 36 is flush with the bottom 30 of housing 20. In this arrangement, keyboard 44 is stowed in an interior of housing 20 behind display 34 and is not accessible to the user of handheld electronic device 10.

Slider element 36 includes a coil or spring (not shown) configured to bias slider element 36 in the closed position (FIG. 2). The slider element 36 is arranged to be moved by the user relative to housing 20 upon application of sufficient force in a sliding direction of the slider element 36. Rear housing portion 24 may include, for example, tracks, rails, grooves, or other structural arrangements on an interior surface thereof to facilitate movement of slider element 36. The tracks or other structural arrangements guide movement of slider element 36 with respect to housing 20 and may include stops or limits that prevent movement of slider element 36 beyond the closed position (FIG. 2) or the open position (FIG. 1) after being moved from one position to another.

Figure 3:
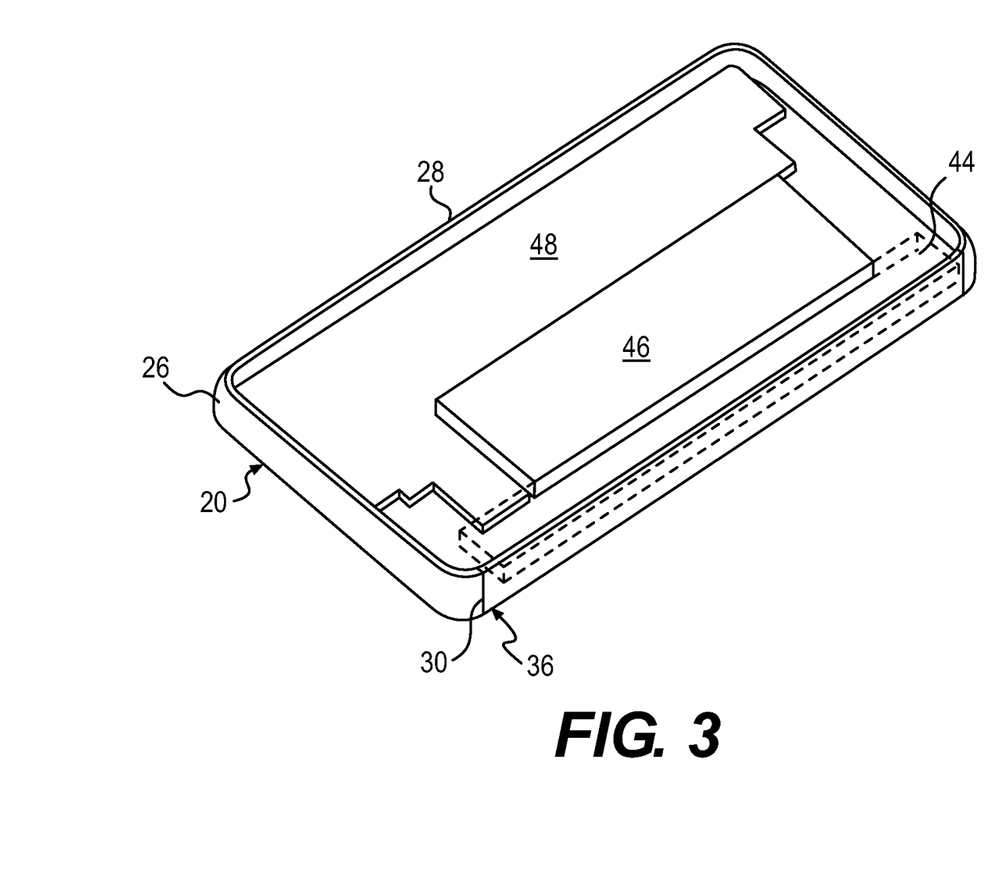
FIG. 3 is a perspective rear view of the handheld electronic device of FIG. 2 with a part of the rear housing portion removed, consistent with disclosed embodiments.

FIG. 3 is a rear perspective view of handheld electronic device 10 when slider element 36 is in the closed position. In this figure, a part of rear housing portion 24 is removed so that further details of handheld electronic device 10 can be revealed. Handheld electronic device 10 includes a battery 46 and a printed circuit board ("PCB") 48 positioned behind display 34 and between front housing portion 22 and rear housing portion 24.

Figure 4:
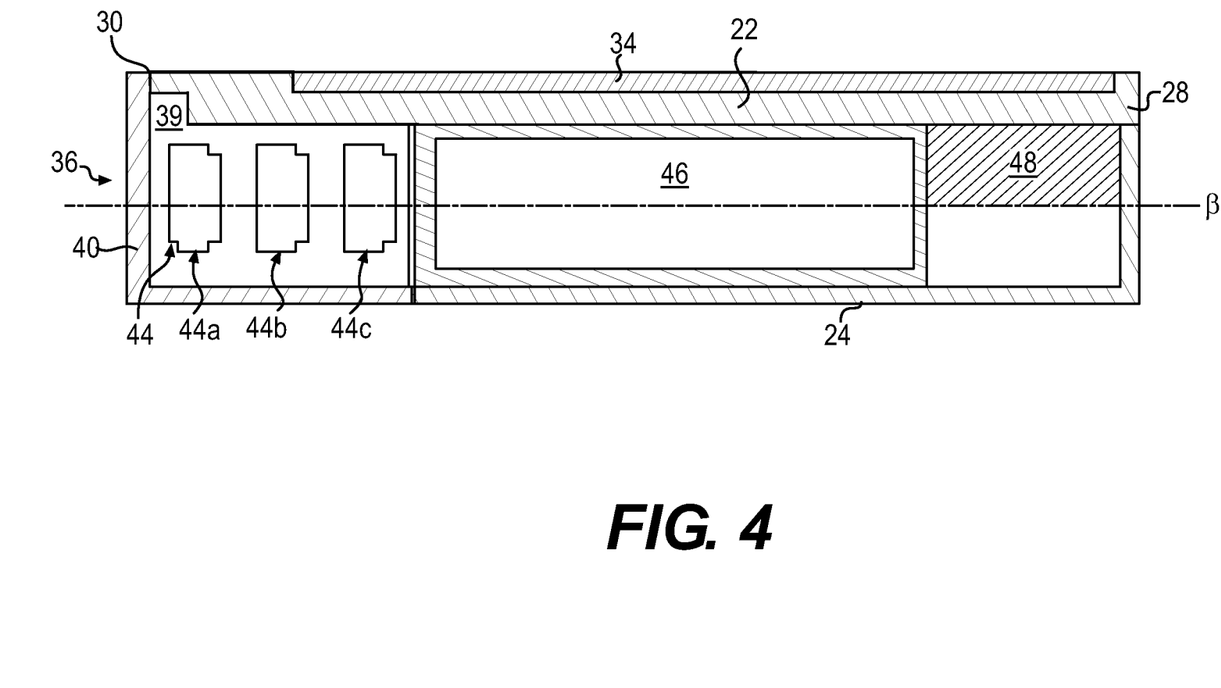
FIG. 4 is a cross-section view of the handheld electronic device, taken along the plane 4-4 shown in FIG. 2, with the keyboard in the stowed position and a plane 1 defined by the bottom of a PCB passing through a battery and the keyboard, consistent with disclosed embodiments.

In conventional slider-type handheld electronic devices, keys are positioned between a battery and a display when the keys are stored in a manner to be inaccessible to a user of the handheld electronic device. This arrangement has its drawbacks as it may increase the overall thickness of such a handheld electronic device. In the embodiment shown in FIG. 4, a plane 13 defined by a bottom of PCB 48 passes through keyboard 44 and battery 46, when slider element 36 is in the closed position. In this manner, keyboard 44, battery 46, and PCB 48 are arranged in side-by-side relation in the space between front housing portion 22 and rear housing portion 24 to reduce the overall thickness of handheld electronic device 10. It is contemplated that other arrangements of keyboard 44, battery 46, and PCB 48 may also be considered. For example, a PCB and a keyboard may be positioned behind a display, and a plane defined by a bottom of the PCB may only pass through the keyboard. That is, a PCB and keyboard may be positioned in a side-by-side relation in the space between a front housing, and a battery may be positioned external to a housing or may be stacked on the PCB in a thickness direction of the device.

Referring to FIG. 5A, first row 44a, second row 44b, and third row 44c of keyboard 44 are configured to have a compact arrangement when stowed in housing 20. In the compact arrangement, first row 44a, second row 44b, and third row 44c are each arranged vertically with a top portion 45 of each row 44a, 44b, 44c facing in a direction substantially parallel to a plane α defined by a bottom of display 34. In this manner, keyboard 44 occupies less space in a direction perpendicular to the thickness of housing 20 (and parallel to plane α).

As slider element 36 translates from the closed position to the open position, keyboard 44 travels from the stowed position (FIG. 4A) through a partially deployed position (FIG. 4B) to the fully deployed position (FIG. 4C). In the partially deployed and fully deployed positions, keyboard 44 is expanded as compared to when keyboard 44 is in the stowed position. In the fully deployed position, first row 44a, second row 44b, and third row 44c are each arranged horizontally with top portion 45 of each row 44a, 44b, 44c facing in a direction substantially perpendicular to plane α. Also, in the fully deployed position, plane α passes through keyboard 44. In the partially deployed position shown in FIG. 4B, keyboard 44 is entirely below plane α.

Handheld electronic device 10 includes a deployment mechanism 56 (FIG. 6) to rotate rows 44a, 44b, 44c of keyboard 44 in a synchronized manner as keyboard 44 is moved between the compact and expanded arrangements. Deployment mechanism 56 includes a series of linkages 58a-58f interconnected along a side of keyboard 44. Rows 44a, 44b, and 44c are each supported by and coupled to linkages 58a-58f. In particular, linkages 58a and 58b are pivotably connected to linkages 58c and 58d, which are, in turn, pivotably connected to linkages 58f and 58e, respectively. Linkages 58a and 58b are pivotably connected to each other and first row 44a at pivot point 60a, linkages 58c and 58d are pivotably connected to each other and second row 44b at pivot point 60b, and linkages 58e and 58f are pivotably connected to each other and third row 44c at pivot point 60c. While a single deployment mechanism 56 is illustrated, it is contemplated that a second deployment mechanism may be positioned along an opposing side of keyboard 44.

Figure 6:
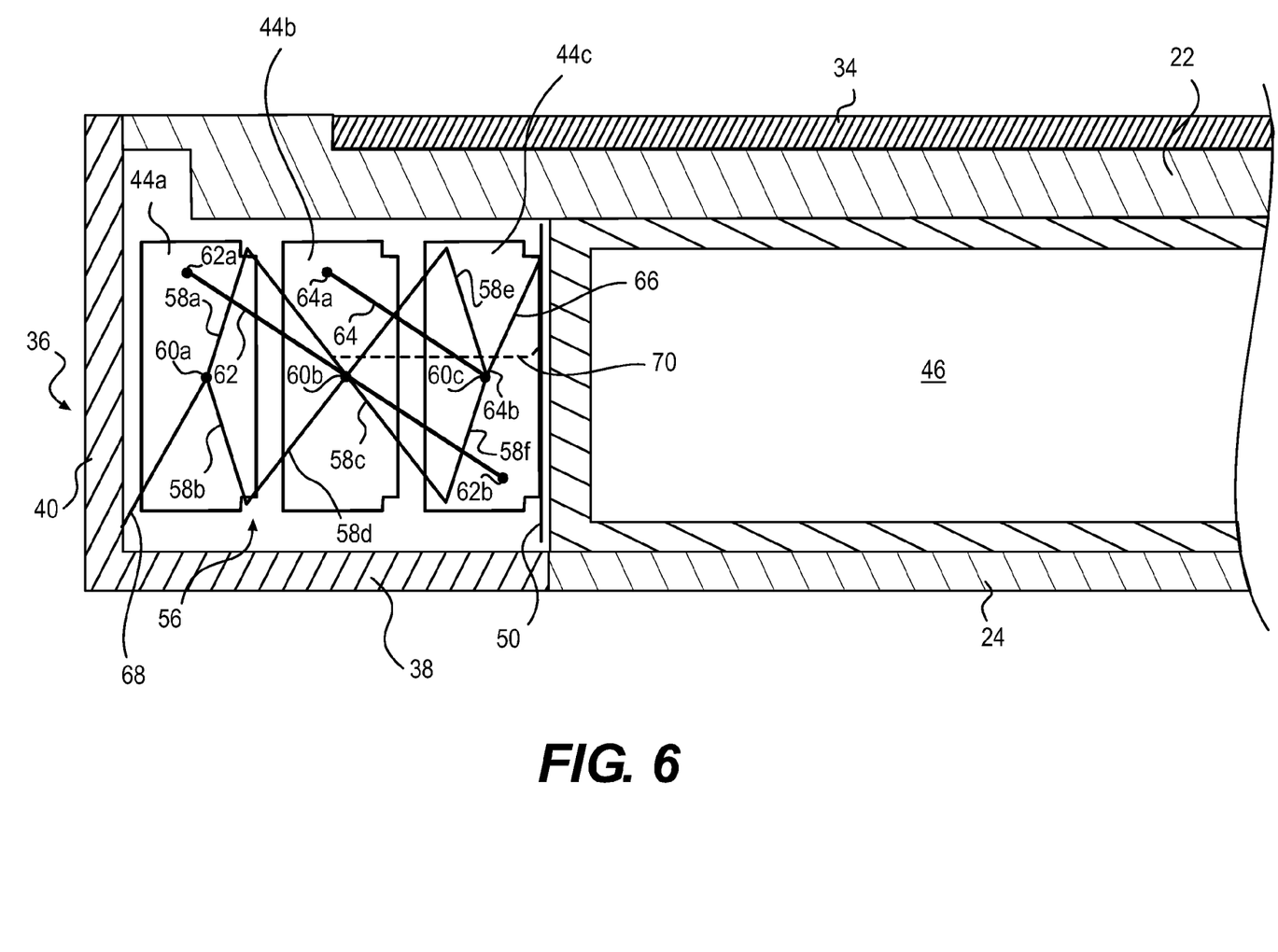
FIG. 6 is a partial cross-section view of the handheld electronic device illustrating a deployment mechanism coupled to the keyboard, consistent with disclosed embodiments.
Figure 7A:
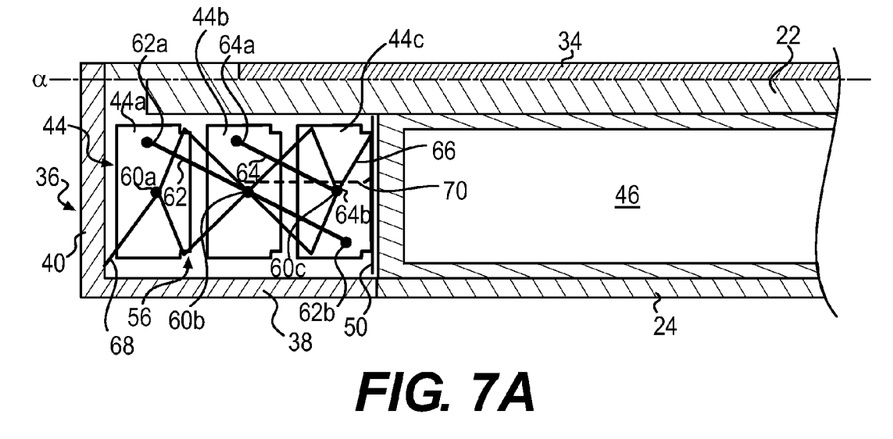
FIGS. 7A-7C are partial cross-section views of the handheld electronic device illustrating movement of the deployment mechanism as the plurality of rows of the keyboard translate from the compact arrangement to the expanded arrangement, consistent with disclosed embodiments.
Figure 7B:
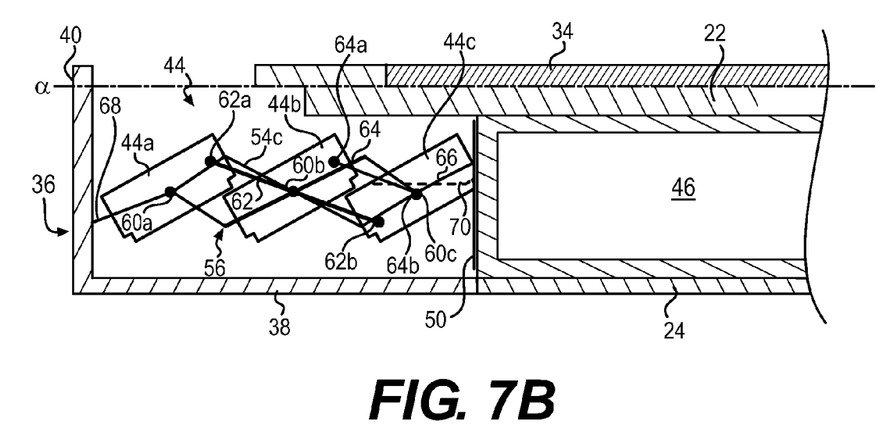
Figure 7C:
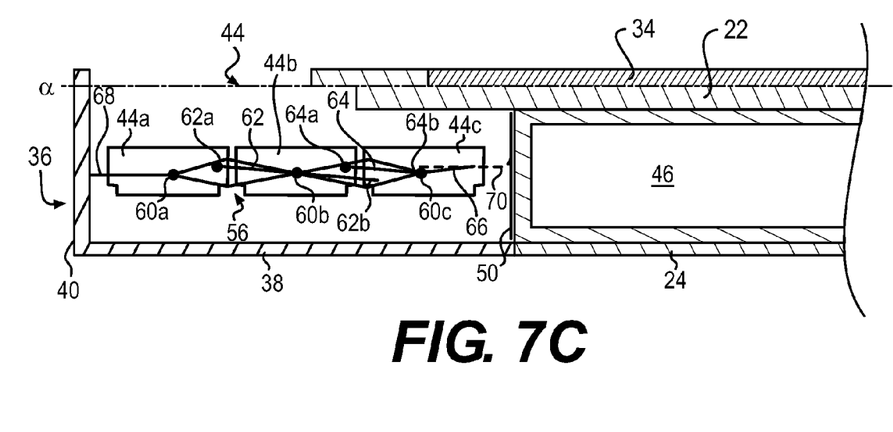

Deployment mechanism 56 is configured to transition between a collapsed configuration (FIGS. 6, 7A) and an expanded configuration (FIG. 7C). In the collapsed configuration, pivot points 60a, 60b, and 60c are in close horizontal proximity to each other and linkages 58a-58f are angled substantially with respect to plane α. As deployment mechanism 56 expands, the distances between adjacent pivot points 60a, 60b, and 60c increase, and linkages 58a-58f rotate such that linkages 58a-58f eventually become substantially parallel to each other and plane α. As deployment mechanism 56 expands, rows 44a, 44b, and 44c each rotate. When expanded, linkages 58a-58f provide a somewhat strong, rigid truss, and the arrangement assumed by linkages 58a-58f is such that rows 44a, 44b, and 44c do not rotate when keys of rows 44a, 44b, and 44c are pressed during normal use by the user. With a sufficient inward pressing force applied to slider element 36, pivot points 60a, 60b, and 60c are brought closer together to retract linkages 58a-58f and move the deployment mechanism 56 from the expanded configuration (FIG. 7C) to the collapsed configuration (FIGS. 6; 7A).

A first link 62 is rotationally coupled to first row 44a at a first end 62a and to third row 44c at a second end 62b. A second link 64 is rotationally coupled to second row 44b at a first end 64a and to third row 44c at a second end 64b. First row 44a, second row 44b, and third row 44c are configured to rotate about respective ends 62a, 62b of first link 62 and ends 64a, 64b of second link 64. Deployment mechanism 56, first link 62, and second link 64 permit synchronized movement of first row 44a, second row 44b, and third row 44c as first row 44a, second row 44b, and third row 44c are moved between the collapsed arrangement and the expanded arrangement. It is contemplated that first end 62a of first link 62 and first end 64a of second link 64 may be configured to slide within a slot (not shown) in a side of first row 44*a* and a slot in a side of second row 44*b*, respectively, after top portions 45 of first row 44*a*, second row 44*b*, and third row 44*c* are oriented to face in a direction perpendicular to plane α so as to adjust the gap formed between adjacent rows.

Handheld electronic device 10 further includes a trailing link 66 and sliding link 68 for moving keyboard 44 between the stowed, partially deployed, and the fully deployed positions. Trailing link 66 extends between deployment mechanism 56 and stationary wall 50. In particular, one end of trailing link 66 is rotationally coupled to linkages 58*e* and 58*f* and an opposing end is slidably coupled to stationary wall 50. Trailing link 66 is configured to ride in a slot (not shown) on stationary wall 50 and a guide track 70 to guide keyboard 44 from the stowed position (FIG. 5A) to the partially deployed position (FIG. 5B).

Sliding link 68 extends between deployment mechanism 56 and front wall 40 of sliding element 36. In particular, one end of sliding link 68 is rotationally coupled to linkages 58*a* and 58*b* and an opposing end of each sliding link 68 is slidably coupled to front wall 40 of slider element 36. Sliding link 68 is configured to ride in a track (not shown) on front wall 40 to change the elevation of keyboard 44 and guide keyboard 44 from the partially deployed position (FIG. 5B) to the fully deployed position (FIG. 5C). The slots in front wall 40 that guide sliding link 68 may include stops or limits (not shown) that prevent movement of keyboard 44 beyond the fully deployed position or the partially deployed position after being moved from one position to another.

FIGS. 7A-7C illustrate the synchronized movement of first row 44*a*, second row 44*b*, and third row 44*c* from the compact arrangement to the expanded arrangement. As discussed above, when a sufficient force is applied to slider element 36 in the sliding direction of the slider element 36 (which is parallel to plane α), front wall 40 of slider element 36 moves relative to stationary wall 50 of housing 20. As front wall 40 moves away from bottom 30 of housing 20, sliding link 68 applies a force to deployment mechanism 56 to transition deployment mechanism 56 from the collapsed configuration (FIG. 7A) to the expanded configuration (FIG. 7C). As adjacent pivot points 60*a*, 60*b*, and 60*c* increase in distance from each other, first row 44*a* pivots about the first end 62*a* of first link 62, second row 44*b* pivots about first end 64*a* of second link 64, and third row 44*c* pivots about ends 62*b*, 64*b* of first link 62 and second link 64 to rotate each row. In transitioning from the collapsed configuration to the expanded configuration, first row 44*a*, second row 44*b*, and third row 44*c* rotate in a clockwise direction as viewed from the perspective of the views of FIGS. 7A-7C. As front wall 40 of slider element 36 extends further from stationary wall 50, trailing link 66 rides downward in a slot (not shown) in stationary wall 50 of housing 20 to fully rotate the third row 44*c*.

After first row 44*a*, second row 44*b*, and third row 44*c* are oriented so that top portions 45 face in a direction perpendicular to plane α, further extension of slider element 36 away from stationary wall 50 pulls trailing link 66 through guide track 70 to move the keyboard 44 out of housing 20 to the partially deployed position (FIG. 5B). After the third row 44*c* has moved out of housing 20, slide link 68 rides upward in a slot (not shown) in an interior surface of a front wall 40 to change the elevation of keyboard 44. In this manner, keyboard 44 moves from the partially deployed position (FIG. 5B) to the fully deployed position (FIG. 5C).

It will be understood that the movements discussed above are reversible, as deployment mechanism 56, first link 62, and second link 64 also permit keyboard 44 to move from the fully deployed position through the partially deployed position to the stowed position when sliding element 36 moves from the open position to the closed position relative to housing 20. In this manner, the device provides the user with the benefits of a large display area and access to a keyboard while maintaining an overall thin profile.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting.

What is claimed is:

1. A handheld electronic device, comprising:
    a housing;
    a display supported by the housing;
    a slider element slidably mounted to the housing, the slider element being configured to move relative to the housing between a closed position and an open position; and
    a keyboard coupled to the slider element and extending to a front wall of the slider element, wherein, wherein the keyboard includes at least two rows of keys and the keyboard is configured such that, when the slider element is in the closed position, the keyboard is disposed in a stowed position behind the display and arranged such that a top portion of each row of keys is oriented to face the front wall of the slider element, and wherein each of the at least two rows of keys is able to individually rotate, such that when the slider element is in the open position, the keyboard is disposed in a fully deployed position and the top portion of each row of keys is oriented to be substantially parallel to a plane defined by a bottom of the display.

2. The handheld electronic device of claim 1, wherein the housing defines a slot for access to an interior of the housing, and wherein the slider element is configured to move into and out of the slot relative to the housing.

3. The handheld electronic device of claim 1, wherein the slider element includes the front wall, a base wall, and a pair of side walls defining a cavity therein.

4. The handheld electronic device of claim 3, wherein the keyboard is configured to move into and out of the cavity.

5. The handheld electronic device of claim 1, wherein the at least two rows of keys are configured in a compact arrangement when the keyboard is in the stowed position, wherein the at least two rows of keys are configured in an expanded arrangement when the keyboard is in the fully deployed position.

6. The handheld electronic device of claim 5, wherein the top portion of each of the at least two rows of keys faces in a direction substantially perpendicular to the plane defined by the bottom of the display when the at least two rows of keys are in the compact arrangement.

7. The handheld electronic device of claim 5, wherein the top portion of each of the at least two rows of keys faces in a direction substantially parallel to the plane defined by the bottom of the display when the keyboard is in the fully deployed position.

8. A handheld electronic device, comprising:
    a housing;
    a display associated with the housing;
    a slider element configured to move relative to the housing; and
    a keyboard linked to the slider element, the keyboard having at least two rows of keys configured to move between a compact arrangement in which the keyboard is disposed in a stowed position behind the display, oriented to face the front wall of the slider element, a top portion of each of the at least two rows faces in a direction substantially perpendicular to a plane defined by a bottom surface of the display, and an expanded arrangement in which a top portion of each of the at least two rows faces in a direction substantially parallel to the plane defined by the bottom surface of the display as the slider element moves relative to the housing, wherein each of the at least two rows of keys is able to individually rotate, in order to move between the compact arrangement and expanded arrangement.

9. The handheld electronic device of claim 8, further including a deployment mechanism pivotably coupled to the at least two rows, wherein the deployment mechanism is configured to move between a collapsed configuration and an expanded configuration to move the at least two rows between the compact arrangement and the expanded arrangement.

10. The handheld electronic device of claim 9, further including a link extending between the at least two rows, wherein the deployment mechanism and the link are configured to synchronize movement of the at least two rows.

11. The handheld electronic device of claim 9, further including:
a sliding link having a first end coupled to the slider element and a second end pivotably coupled to the deployment mechanism; and
a trailing link having a first end coupled to a stationary wall of the housing and a second end pivotably coupled to the deployment mechanism,
wherein the sliding link and the trailing link are configured to transition the deployment mechanism between the collapsed configuration and the expanded configuration as the slider element moves relative to the stationary wall.

12. The handheld electronic device of claim 8, wherein the keyboard is positioned behind the display when the at least two rows are in the compact arrangement.

13. The handheld electronic device of claim 8, wherein the plane defined by the bottom of the display passes through the keyboard when the at least two rows are in the expanded arrangement.

14. The handheld electronic device of claim 8, wherein the housing defines a slot providing access to an interior of the housing, and wherein the slider element is configured to move into and out of the slot relative to the housing.

15. A handheld electronic device comprising:
a housing having a front housing portion and a rear housing portion;
a display supported by the front housing portion;
a battery disposed between the front housing portion and the rear housing portion;
a printed circuit board ("PCB") disposed between the front housing portion and the rear housing portion;
a slider element configured to move relative to the housing; and
a keyboard linked to the slider element and configured to slide relative to the front housing portion and the rear housing portion between a stowed position and a fully deployed position, wherein the keyboard includes at least two rows of keys and is configured such that, when the keyboard is in the stowed position, the at least two rows of keys may be individually rotated such that the keyboard, the battery, and the PCB are arranged behind the display, oriented to face the front wall of the slider element, between the front housing portion and the rear housing portion and a plane defined by a bottom of the PCB passes through the battery and the keyboard.

16. The handheld electronic device of claim 15, wherein the keyboard includes at least two rows of keys, and wherein the at least two rows of keys are configured in a compact arrangement when the keyboard is in the stowed position.

17. The handheld electronic device of claim 16, wherein, when the at least two rows are configured in the compact arrangement, a top portion of each of the at least two rows faces in a direction that is substantially perpendicular to a plane defined by a bottom portion of the display.

18. The handheld electronic device of claim 16, wherein the at least two rows are configured in an expanded arrangement when the keyboard is in the fully deployed position.

19. The handheld electronic device of claim 18, wherein, when the at least two rows are configured in the expanded arrangement, a top portion of each of the at least two rows faces in a direction substantially parallel to a plane defined by a bottom portion of the display.

20. The handheld electronic device of claim 15, further including a slider element coupled to the keyboard, the slider element being configured to move relative to the housing to transition the keyboard between the stowed position and the fully deployed position.

* * * * *